F. E. FELTS.
WHEEL.
APPLICATION FILED NOV. 10, 1908.

936,708.

Patented Oct. 12, 1909.

WITNESSES:

INVENTOR
Fletcher E. Felts
BY
his ATTORNEY

UNITED STATES PATENT OFFICE.

FLETCHER E. FELTS, OF LOS ANGELES, CALIFORNIA.

WHEEL.

936,708.  Specification of Letters Patent.  Patented Oct. 12, 1909.

Application filed November 10, 1908. Serial No. 461,932.

*To all whom it may concern:*

Be it known that I, FLETCHER E. FELTS, citizen of the United States, residing at Los Angeles, in the county of Los Angeles and State of California, have invented certain new and useful Improvements in Wheels, of which the following is a specification.

This invention contemplates the elimination of pneumatic tires for wheels, particularly used for horseless vehicles, one of the objects of the invention being to provide a simple and compact wheel having the resiliency of a pneumatic tire.

Another object of this invention is to provide a wheel having removable spokes for the purpose of repairing any fracture or damage resulting to any of the individual spokes, and at the same time to construct a wheel, all of the parts of which are readily assembled and dissociated as necessity may require.

With these and other objects in view, this invention consists of the features, details of construction and combination of parts, as will be described in connection with the accompanying drawing, and then be more particularly pointed out in the claims.

Figure 2:
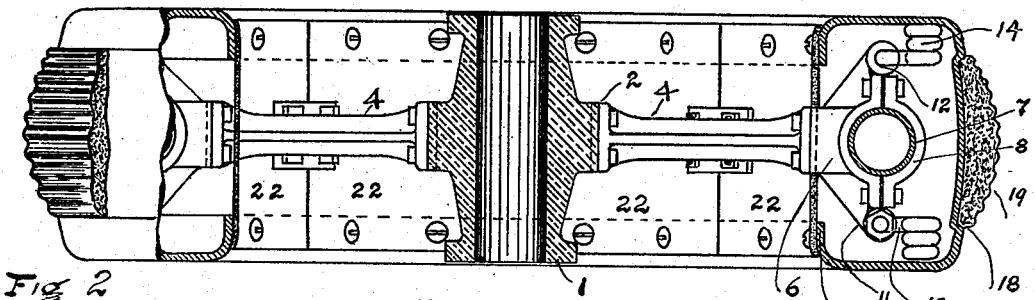
Figure 1:
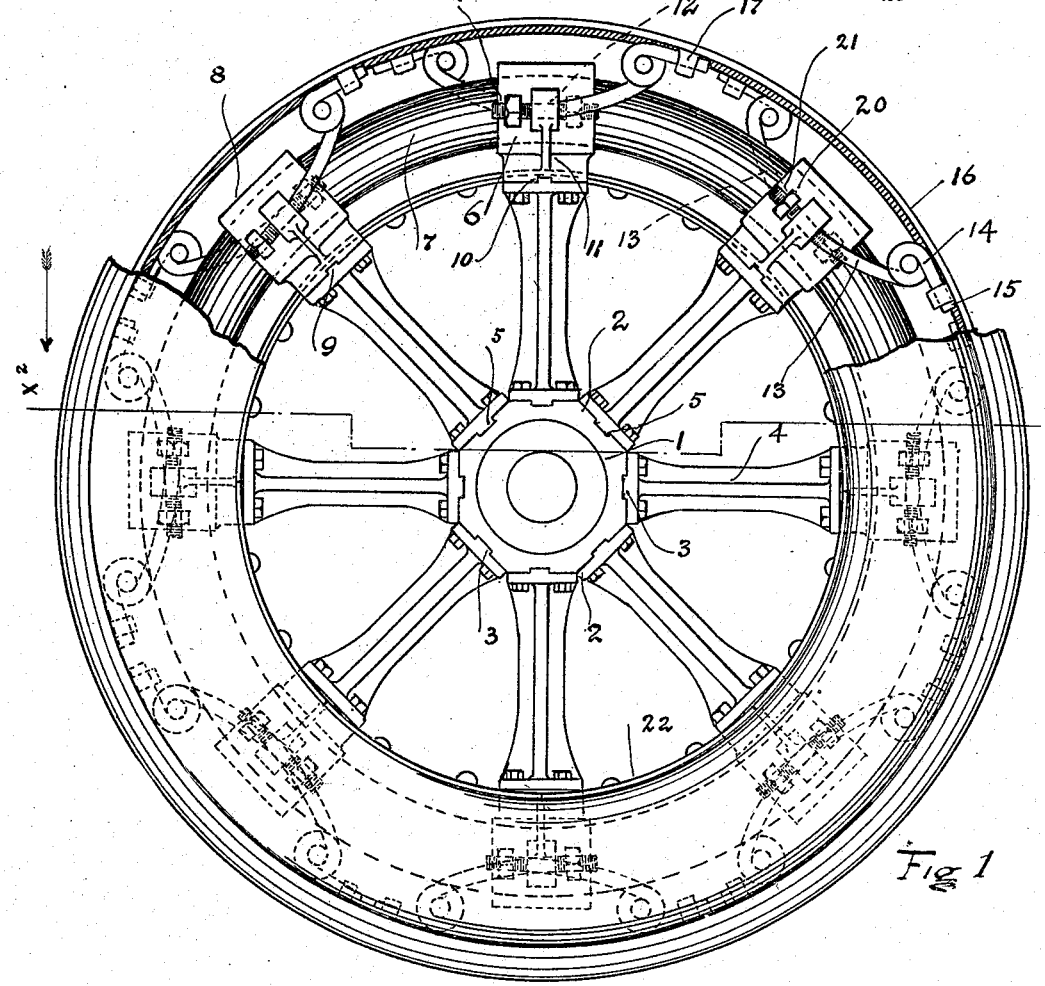

In the drawing, Figure 1, is a side elevation, partly in section showing the invention as applied, and Fig. 2, is a vertical section on lines $x^2$—$x^2$, Fig. 1.

Specifically referring to the drawing, 1, designates a hub having a plurality of flat surfaces, 2, each of said flat surfaces being provided with a transverse groove, 3. Onto said flat surfaces, 2, are arranged to be bolted or otherwise secured spokes, 4, provided with lugs 5, which engage said grooves, 3.

6, designates yokes mounted on an annulus, 7, and secured on said annulus, 7, by caps 8, bolted to said yokes, 6. The other ends of said spokes, 4, are bolted onto said yokes, and the torsional strains on the wheel are eliminated or reduced by lugs, 9, provided on the ends of the spokes, and grooves, 10, in the yokes, 6, into which the lugs, 9, fit. Integral with said yokes, 6, and disposed on opposite sides thereof are webs, 11, provided with orifices, 12. The elongated termini, 13, of helical springs, 14, are arranged to extend through said orifices, 12, while the other ends or termini, 15, of said helical springs, 14, are rigidly secured against movement in the tire, 16, as by apertured lugs, 17, made integral with said tire, 16, which tire has a peripheral groove or depression, 18, arranged to receive a cushion of elastic or other material, 19.

The orifices, 12, provided in the webs, 11, of the yokes, 6, are somewhat widened at both ends thereof to insure a rocking motion to the partially elliptical spring termini, 13, thereby to cause a ready response to all strains from the load, either vertical or tangential, and at the same time to render the slight travel of the spring termini in the orifices, frictionless and immediate. To provide for decreases in the tension of the elliptical termini, I provide nuts, 20, arranged to engage the threaded ends, 21, of the spring termini.

The tire, 16, as will be seen, nearly incases the entire working parts of the wheel, except at the top, where the closure is effected by a plurality of leather or other strips, 22, screwed or otherwise fastened to the inwardly bent periphery 23, of the tire.

The partially elliptical spring termini 13, of the helical springs 14, are, as seen from the sectional illustration, Fig. 2, disposed on opposite sides of the annulus 7, and yokes 6, and in this manner the load is equally distributed on both sides of said annulus, while all of the springs are equally called into play when by reason of the load, the hub is caused to become eccentric to the wheel or tire. Whenever the hub changes temporarily its position of concentricity relative to the rim each series of springs individually performs its function of expansion and contraction, in avoidance of any twisting or torsional strains.

What I claim, is:

1. A hub, spokes having one end bolted thereto, a hollow annulus, yokes thereon, forming a seat for the other ends of said spokes, a tire, and a series of coiled springs fastened to said tire, said springs having elongated ends, said ends being arranged to engage said yokes.

2. A hub, a hollow annulus, yokes on said annulus, spokes secured to said hub and said annulus, a tire, and resilient means fastened to said yokes for supporting said annulus and yokes.

3. A hub, a hollow annulus, yokes on said annulus, spokes bolted to said hub and said yokes, a tire, and helical springs fastened in said tire, said springs having elongated ends arranged to engage said yokes and resiliently support said yokes and annulus.

4. A hub, a hollow annulus, yokes on said annulus, spokes bolted to said hub and said yokes, a tire, strips secured to said tire, and means fastened to said tire and yokes to resiliently support said annulus.

5. A hub, a hollow annulus, yokes on said annulus provided with webs, spokes bolted to said hub and yokes, a tire incasing said annulus and yokes, and coiled springs provided with elongated ends, said springs being secured in said tire, and said elongated ends being arranged to engage said webs, and resiliently support said annulus.

6. A hub, a hollow annulus, yokes on said annulus provided with webs, spokes bolted to said hub and said yokes, a tire incasing said annulus and yokes, and helical springs fixed to said tire and having elongated ends arranged to engage the webs on said yokes, and means to regulate the tension of said springs.

In testimony whereof I affix my signature in presence of two witnesses.

FLETCHER E. FELTS.

Witnesses:
GERTRUDE M. CALDWELL,
ANTON GLOETZNER, Jr.